United States Patent [19]
Packard

[11] 3,826,508
[45] July 30, 1974

[54] RING MANUFACTURE, PRODUCTIVE OF LINE CONTACT SEAL

[75] Inventor: Norman M. Packard, Des Plaines, Ill.

[73] Assignee: International Harvester Company, Chicago, Ill.

[22] Filed: Oct. 1, 1970

[21] Appl. No.: 77,163

Related U.S. Application Data

[62] Division of Ser. No. 757,973, Sept. 6, 1968, Pat. No. 3,587,155.

[52] U.S. Cl. ................................. 277/216, 277/171
[51] Int. Cl. .................................................. F16j 9/20
[58] Field of Search........ 277/96 R, 96 A, 236, 216, 277/173, 168, 169, 170, 171; 29/156; 51/324

[56] References Cited
UNITED STATES PATENTS

| | | | |
|---|---|---|---|
| 1,434,591 | 11/1922 | Copp | 277/171 |
| 1,803,955 | 5/1931 | Wenzel | 277/171 |
| 1,919,183 | 7/1933 | Paton | 277/173 |
| 2,177,700 | 10/1939 | Fisher | 277/216 |
| 2,459,395 | 1/1949 | Smith | 277/216 |
| 2,853,323 | 9/1958 | Engelking et al. | 277/96 A |
| 3,073,689 | 1/1963 | Kupfert et al. | 51/324 |
| 3,231,284 | 1/1966 | Peickii et al. | 277/38 |
| 3,337,938 | 8/1967 | Prasse | 29/156.6 |
| 3,970,023 | 1/1961 | Thompson | 277/216 |

*Primary Examiner*—Harry N. Haroian
*Assistant Examiner*—Robert I. Smith
*Attorney, Agent, or Firm*—John W. Gaines; Floyd B. Harman

[57] ABSTRACT

Methods, apparatus, and improved structure having as their common basis the sequence of collapsing a piston ring in a fixture approximating engine bore diameter, and lapping a locality at the side of the ring while so collapsed, until a circumferentially continuous portion—narrow in width and preferably line size—of the side is flat in the range of at least about 10 to 5 light bands. That is to say the out-of-flatness of the circumferentially continuous portion, state another way, is limited to a range equivalent to about 5 to 10 light bands at standard inspection wavelength. One of the broadest methods disclosed is the use exclusively of rings so carefully made and so lap inspected as above on a percentage basis that the inner peripheral edge at the side has all points thereon in coplanarity to a degree equivalent to the stated range to seal in absolute contact in a substantially continuous sealing ring.

3 Claims, 11 Drawing Figures

PATENTED JUL 30 1974 3,826,508
SHEET 1 OF 2
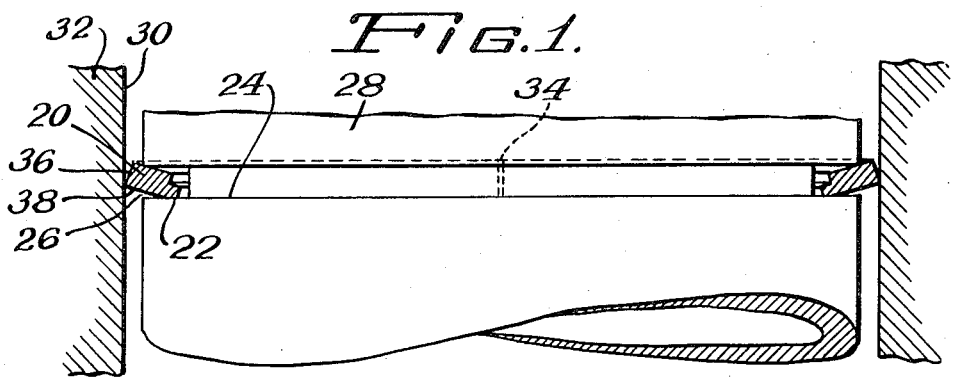
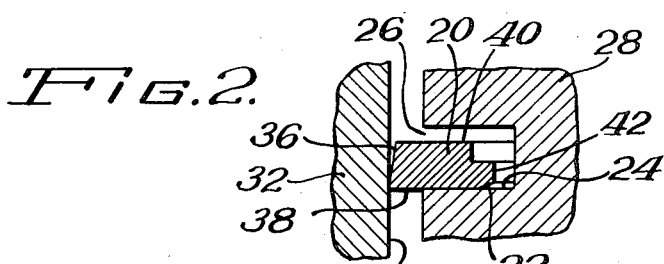
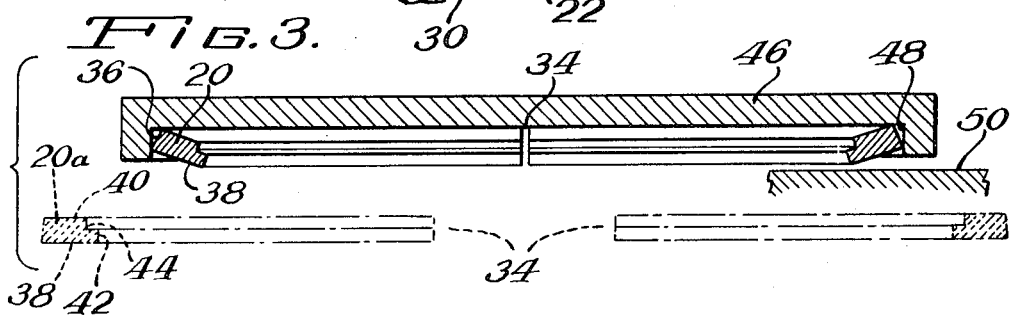
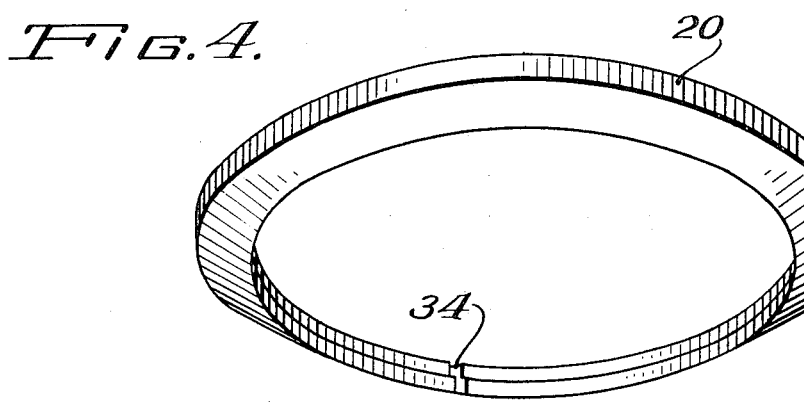
Inventor:
Norman M. Packard
By John W. Gaines
Atty.

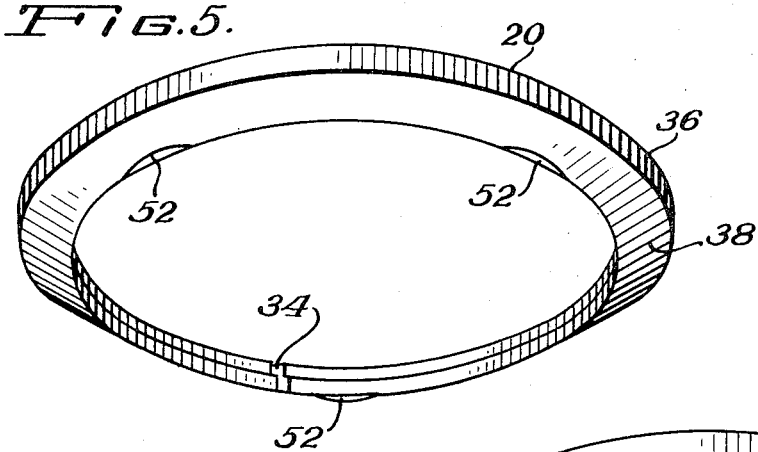
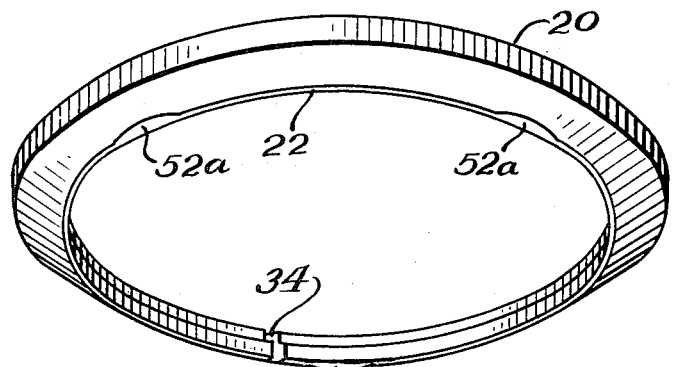
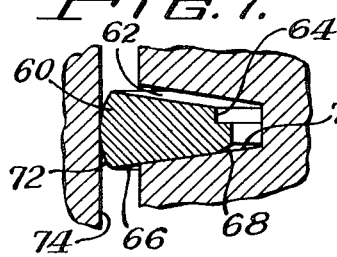
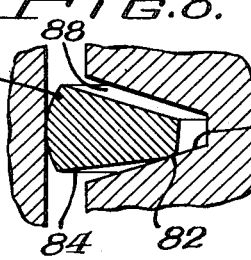
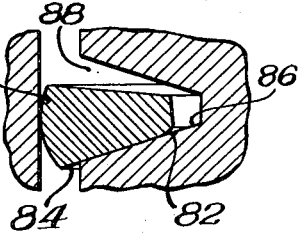
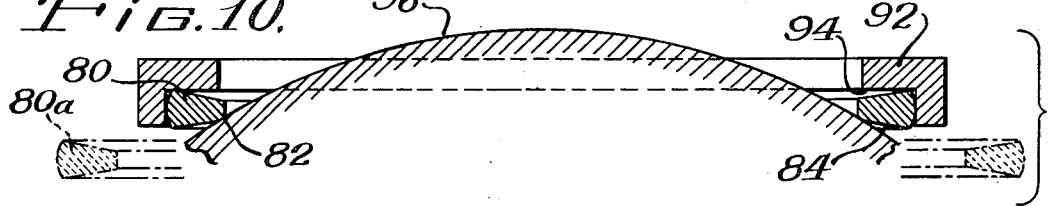
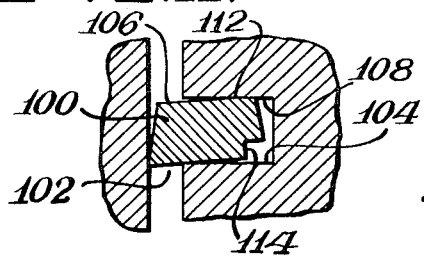
Inventor:
Norman M. Packard
By John W. Graines
Atty.

RING MANUFACTURE, PRODUCTIVE OF LINE CONTACT SEAL

This application is a division of Packard Ser. No. 757,973 filed Sept. 6, 1968. (U.S. Pat. No. 3,587,155).

Blowby presents a problem in production piston engines. The need, as I envision it, is to control blowby so that in production we are capable both of making it predictable and of keeping it at a uniform, desirably low value from engine to engine, at least in precision made production engines which, in general, are of the multi-cylinder type. Blowby is one of the factors affecting lubricating oil control. Solving the blowby problem will have a material influence on reducing oil consumption in engines, and I have discovered that the key to the solution is in the compression rings on the pistons.

According to my inventions, the engines are sealed, i.e., each piston and its surrounding cylinder wall are mutually sealed by an interposed piston ring either so selected that the inner peripheral edge of the ring at the groove sealing side thereof is coplanar at all points or else so localizedly lapped, in a narrow band along the inner peripheral edge at the side, that the ring will seal the confronting side of a receiving groove in a narrow, circumferentially continuous ring of pressure contact which amounts to line contact or, at most, has only slight width at the widest points. The resulting ring at the side of the piston ring makes up only a minor portion of the overall side. The overall side of the ring which seals the groove side as aforesaid forms, for at least its major portion as viewed in cross section, a slight angle to the groove side and is frusto conical although the groove side may or may not be frusto conical.

The disparity in the angularity between the mutually confronting sealed and sealing sides of the respective receiving groove and piston ring is deliberate, and under pressure during compression and firing in the engine cylinder the ring deflects into what amounts to face contact with the groove side over at least a major portion of the side of the ring, thus multiplying to substantial proportions the sealing area at the critical time. So sealing with narrow band contact and line contact or sealing with face contact, depending upon the presence or absence of high pressure conditions, complement one another to reduce the blowby, i.e., escape of firing pressure into the crankcase by leakage in the cylinders past the pistons.

My inventions thus materially reduce or substantially eliminate the problem of unpredictability and largely uncontrollably high magnitude of blowby, as will now be explained in detail. Features, objects, and advantages will either be specifically pointed out or become apparent when, for a better understanding of the inventions, reference is made to the following description taken in conjunction with the accompanying drawings which show certain preferred embodiments thereof and in which:

FIG. 1 is a longitudinal elevational view of a portion of a piston and cylinder in an engine embodying the present ring invention, and shown with the embodiment in one of its operating positions in collapsed state;

FIG. 2 is an enlarged fragmentary veiw corresponding to FIG. 1, but showing that embodiment of the invention in another operating position;

FIG. 3 shows the embodiment of FIG. 1 in the same collapsed state, but in a lapping fixture for doing the work on the ring to bring it to the finished stage;

FIGS. 4, 5, and 6 are sequence views of the ring as lapped, showing the respective beginning, intermediate, and finished stages;

FIG. 7 corresponds to FIG. 2, insofar as a fully seated or firing position is being viewed, but showing a modified piston and ring structure;

FIGS. 8 and 9 are similar to FIGS. 1 and 2, insofar as respective line seated and fully seated positions are being viewed, but showing a further modified piston and ring structure;

FIG. 10 corresponds to FIG. 8, but with the ring in a lapping fixture to bring it to the final stage; and FIG. 11 corresponds to FIG. 1, insofar as a line seating position is being viewed, but showing a further modification of the ring.

My inventions about to be particularly described apply to, among others, rectangular positive torsion ring structure, keystone rings with either plain structure or positive torsion structure, and rectangular negative torsion or reverse dish ring structure. Slightly oversimplified, a positive torsion ring is basically one which is twisted in a ring groove of rectangular cross section with the lower side of the ring bearing against the bottom of the groove at the radially inner part of the groove and inclining upwardly and outwardly therefrom. A positive torsion keystone ring is, to a much more moderate extent, along the same lines above but it fits in a tapered or wedge shaped groove on a piston. A keystone ring without torsion causing it to twist in the groove is a plain keystone ring, but it nevertheless fits in a wedge shaped groove. Finally, the negative torsion ring twists in a rectangular groove whereby what the ring does is to have the upper side of the ring bear against the top of the ring groove in the inner part of the groove, slanting downwardly and outwardly therefrom, or else what the ring does is to have the lower side of the ring bear against the bottom of the ring groove in the outer part of the groove, inclining upwardly and inwardly therefrom, or else the ring does both.

All of the rings concerned are the so-called split rings, having a parting located at some point around the circular length of the ring. Each such ring is compressed from its normal relaxed or free state by means of a ring compressor so that it assumes a collapsed state with the parting closed or substantially so. In reaching the collapsed state, the torsion ring twists or distorts or dishes out of its normal plane in well known way dependent upon whether the curved inner face at the back of the ring has been selectively undercut at one side or the other of the ring. When collapsing, the torsion ring always takes a dished position with the undercut portion occupying what becomes the concave side of the dish.

The metal of the foregoing rings is usually cast iron, and the pistons are cast iron or an aluminum alloy. Pistons in the latter category have the compression ring grooves formed either directly in the aluminum or in hardened, grooved inserts carried by the aluminum piston.

Against this background, it is believed that FIGS. 1, 2, 3, 4, 5, and 6, showing one preferred embodiment of my ring invention, can be readily understood.

LINE SEATED OPERATION, COLLAPSED STATE—FIG. 1.

A rectangular, positive torsion ring 20 is shown in that one of its operating positions in an engine in which the ring is line seated at the side, i.e., a narrow seal band 22 thereon establishes at least line contact with the inner portion of the confronting lower side 24 of a rectangular groove 26 in a piston 28. The piston reciprocates within the wall 30 of a cylinder of a multicylinder engine 32, being sealed to the wall by the ring 20. The ring 20 is a compression ring, and is illustrated in the top or first ring position on the piston although the design is fully effective as the second, third, etc., compression ring on a multi-ringed piston.

The adjacent ends of the ring defining the parting indicated at 34 are practically touching at the operating temperature of the ring, but in each engine the designer always takes care (providing a ring gap of 0.010 to 0.020 inch is usually an adequate safeguard) to keep them from actually bottoming against one another because of the danger that the ring might seize in the cylinder. The ring is thus a live ring, functioning at all times as a cast iron spring.

In the collapsed operating state in the groove as shown in FIG. 1 the ring has a twisted position, due to its inherent torsion, during the successive exhaust and suction strokes of the piston 28. The slight acute face angle, which the essentially cylindrical face 36 of the ring makes with the vertical, accounts for a unidirectional oil pumping action produced by the ring. During the exhaust strokes referred to each of which is in the outward (upward) direction, the ring provides good oil control, keeping an oil film on the hone pattern in the wall 30 at a sufficient but minimum thickness for lubrication purposes. During each suction stroke, which is inward, the ring 20 due to its slight face angle scrapes the oil in the inward (downward) direction because of the closed pocket formed by the contact between the ring and each of the cylinder wall 30 and the lower groove side 24. The oil cannot readily get into the groove 26 because of the ring of pressure contact of the sealing band 22, and so the oil is pushed inwardly ahead of the bottom side of the ring indicated at 38 and now to be described in connection with the operating conditions of compression and firing.

FULLY SEATED OPERATION, COLLAPSED STATE—FIG. 2

During the successive compression and firing strokes of the piston 28, the ring of pressure contact effected by the line-seated seal band 22 always insures as a first stage of sealing that no appreciable pressure dissipation can take place by leakage past the ring. Hence, the ring 20 is flattened by the ensuing build-up of pressure and, by a second stage of sealing, the bottom side 38 of the ring is forced into a fully seated area of face contact against the major portion of the confronting bottom side 24 of the groove 26.

The trapped pressure produces a consequent downward and outward force against the respective flat upper side 40 and curved rear side 42 at the back of the ring. Hence, the curved face 36 at its lower edge is both spring loaded mechanically and pressure loaded by gas into essentially leak-free contact with the cylinder wall 30.

Although not present to the exaggerated extent as shown in FIG. 2, there is in fact an obtuse angle of intersection between the band 22 and the major portion of the lower side 38. The respective lower and upper sides 38 and 40 are parallel, horizontal, and flat both in this face contact collapsed state for obvious reasons and in the state now to be described.

NORMAL RELAXED OR FREE STATE—FIG. 3

In the free spring state of the ring having a fully expanded diameter as shown by the broken lines 20a in FIG. 3, the adjacent ends of the ring move to their fully withdrawn position so that they are parted considerably at 34. It is when the spring is unloaded and in free state, during the manufacturing process, that the respective upper and lower sides 40 and 38 are made flat and parallel, and the side 38 is preferably lapped in a lapping fixture to within the range of 10 to 5 light bands or to greater flatness, such as to two light bands flat, at standard inspection wavelength (helium). Hence, the bottom side 38 of the ring will provide effective face sealing when in the fully seated operating position shown in FIG. 2.

In order to make the ring 20 twist because of its cross section, the curved rear side or back 42 is relieved by an undercut adjacent the top side 40 only, as by a chamfer or, as actually illustrated, a counterbore 44. So there is definite asymmetry in the cross section whereby, when the parting in the ring is closed, the ring dishes into an upwardly concave collapsed form, now to be further discussed.

LAPPING, BEGINNING STAGE—FIG. 3

An aspect of novelty is believed to reside in the fact that, prior to my discovery of the realities of the matter, there had been and never was any basis for accepting as a foregone conclusion that a positive torsion ring, flat on the bottom side in free state, would so uniformly distort into its collapsed state as to establish line contact with a groove side which was to be sealed thereby and which was planar or substantially so. Prior to my discovery, and consistently confirmed as a fact in random checks made by me, it was never appreciated and yet as a general rule the usual production-made positive-torsion ring in collapsed state was non-coplanar along its sealing inner periphery which presented a succession of high spots and low spots, somewhat according to a wavy or undulating pattern. Hence, there existed no fundamentally orderly and systematic way whereby the engine designer or assembler could predict the amount of blowby which would be produced by each engine when finally built.

One of my methods of providing a piston ring in production engines effective to control the blowby and oil consumption to an exceptional proportion by better sealing includes, as a first step, compressing a ring, such as the ring 20 in FIG. 3, radialwise into its collapsed state in the movable fixture 46 of a lapping apparatus. The ring receiving mouth 48 of the fixture has identical diameter to the cylinder bore size of the engine in which the ring 20 is to be installed. The lapping apparatus further includes a flat, fixed confronting lapping surface 50, the ring 20 being held relative thereto so that the side 38 forms at all times a slight acute angle to the flat surface 50. The mouth 48 of the fixture 46 is, on the one hand, shallow enough that the inner periphery only of the lower side 38 of the ring projects into contact with the surface 50. At the same time, the shallow mouth 48 is nevertheless deep enough to engage the outer periphery of the side 38, where the latter joins with the face 36 of the ring, thereby retaining the ring in a collapsed state the same as if restrained in operating condition in a cylinder of the nominal bore size of the engine.

In the case of the usual positive torsion piston ring prior to my discovery, low spots would be present on the inner periphery at the side of the ring 20 which would not contact the surface 50 at the beginning of lapping.

LAPPING, INTERMEDIATE STAGE—FIG. 5

Lapping is preferably accomplished by forced motion of the fixture 46 in a figure eight movement in the plane of the fixture and ring relative to the fixed surface 50. Other specific movements to produce equivalent lapping can be utilized, the critical factor being to prevent perpendicularly loading the fixture 46 on the surface 50. About one pound total perpendicular pressure has been found acceptable, without producing the undesirable result of distorting the ring 20 from the normal twisted position into which it would be distorted by torsion when operating in a compression ring groove in an engine.

The first points abraded by the lapping compound on the flat surface 50 will be the high spots 52 initially forming circumferentially spaced apart flats on the inner periphery of the lower ring side 38. Continued abrading by the surface 50 keeps lowering the high spots 52 relative to the plane of the lowest spots of the inner periphery.

LAPPING, FINISHED STAGE—FIG. 6

In the stage illustrated in FIG. 6, the lapping of the ring 20 has progressed to the final stage, all lapping having been performed with the parting 34 closed or substantially so although the parting is greatly emphasized in the figures of drawing to illustrate presence of the gap. All spots will have merged into the common continuous sealing band 22 with the former high spots forming the widest portions 52a in the band. Here again, the band width is greatly exaggerated to be perceptible in the illustration. Because of its finite width dimension, the band 22 can be literally said to have flatness, and such flatness is measurable and preferably in the range equivalent to at least about 10 to 5 light bands, at standard inspection wavelength (helium). No greater approach has been found necessary to perfect flatness of the seal band in order to achieve the practical control of blowby desired, although 2 light bands would, for example, improve the operation at least theoretically.

Anyway, the precise range of flatness is not the matter of basic importance here involved, but rather it is systematic analysis and insurance in all cases of a good sealing contact. So a band of the flatness and specific shape of the varied width band 22 as shown in FIG. 6 is not necessarily the most desirable, nor is the provision of a band desirable in all cases.

BAND CONTACT, NARROW WIDTH

Achieving sealing contact by what is believed a better way than the foregoing is by the provision of a ring having a band of essentially uniform narrow width, not illustrated.

Since my discovery, it has been observed that at times positive torsion rings produced in manufacture include some rings which, by happenstance, have a protruding inner periphery which in the collapsed state of the ring is practically coplanar at all points. Despite their random occurrence, the marshalling out of such rings by a selection-rejection process is feasible, and each of those rings in such a select group is lapped only slightly whereupon the group will have fully advanced to the finished stage. Inherently, such rings have a very narrow sealing band, almost uniform in width, and they highly successfully seal in accordance with the principles of my inventions.

LINE CONTACT—FIG. 4

Perhaps the best way, and no doubt the ideal way, of accomplishing the sealing hereof is to apply the selection-rejection process and separate out all rings in a production run which by happenstance display precise coplanarity of the inner periphery at all points when the ring is distorted into the collapsed state.

In fact since my discovery, it has been observed that careful control in ring manufacture over such variables as metallurgy, manufacturing procedure, and details of ring design such as cross section and the like, can materially increase the proportion of rings in a production run above what could be expected as the happenstance or random group having coplanarity of the inner periphery of the bottom side at all points. So through careful control of the manufacturing process and other variables, the deliberate increasing of the proportions of such rings in a run can be realized to an expectancy of 50 percent and better, perhaps upwards of 90 percent, or 95 percent, or possibly of 98 percent, which will have what can be stated as the coplanarity inherency in the peripheral portion of the ring when distorted into collapsed state. Stated another way, the inner periphery of the sealing side of the ring in each case is a uniplanar knife edge.

In such case, the product becomes not the happenstance or exception but the rule, and what essentially amounts to absolute line contact of sealing, i.e., contact having only a substantially continuous length dimension and no width, can be achieved with the ring. To tell the truth, the confronting side of the groove which is sealed by such a ring in service actually acts as a lapping surface to a degree, and in the course of engine operation the groove side can lap the ring periphery from an edge into a band.

Obviously, the selection-rejection process will have to be retained at least to the extent of a spot check. Though possible, it sounds somewhat idealistic to expect to achieve rings which to a 100 percent extent have inner peripheries on each of which the locus of all points will fall in one plane. Practical manufacturing does not allow absolute predictability and certainly the manufacture of positive torsion rings which must be distorted to install them does not allow absolute predictability.

The ring of FIG. 4 can be viewed as such a ring having substantially absolute coplanarity along the inner periphery, and it will be understood that the parting at 34 although greatly exaggerated corresponds to the operative parting or split or gap in the ring in collapsed state in the line seated position. The spot checking, referred to, of such production rings is no destructive test, and a ring so tested is merely lapped a few test strokes to the point where the resulting uninterrupted flat band can be perceived visually. The ring is prefectly usable, establishing in the line seated position a band contact and not literally line contact with the confronting surface to be sealed.

FULLY SEATED, POSITIVE TORSION KEYSTONE RING—FIG. 7

In the modification of FIG. 7, the parts are the same except that a ring 60 as shown is a positive torsion keystone ring and the receiving groove 62 therefor is a complementary wedge shaped groove having a taper. Similarly to the preceding embodiment, the back of the ring 60 is undercut at 64 with a counterbore in the upper part of the curved inner side of the ring. The ring 60 has a bottom side 66 provided with a lapped seal band 68 located at the inner periphery where the bottom side joins with the back of the ring.

The ring 60 is not shown in its line seated operating condition or its band seated position which occur in the collapsed state and which can be readily visualized. Instead, FIG. 7 shows the ring in its fully seated position in collapsed state providing a wide area of face sealing contact with the confronting bottom side 70 of the receiving groove 62.

Consistent with the usual design of keystone rings, the ring 60 has a barrel face 72 which as viewed in cross section affords a smooth curvature making contact with a confronting cylinder wall 74 as the ring 60 changes between line seated and fully seated positions in the groove.

The operation is the same as in the preceding embodiment, during both the consecutive exhaust and intake strokes of the engine on the one hand (line seated), and the consecutive compression and firing strokes of the engine on the other hand (fully seated).

In customary manner, the bottom side 66 of the ring 60 in collapsed state in the line seated condition or band seated position (not shown) makes a slight angle to the horizontal, whereas the groove side 70 is machined with a slight angle to the horizontal which is nevertheless somewhat larger than the referred to angle of the ring side 66. Hence, the ring 60 reacts in operation by fully seating against the groove side 70 under compression and firing pressures in the engine.

Most torsion type rings are of rectangular shape, which rings usually have the greater susceptibility to ring sticking because of the shape. Inasmuch as keystone rings are substantially free from susceptibility to sticking, most of the keystone rings are plain keystone rings.

KEYSTONE RING, PLAIN—FIGS. 8 and 9

A plain keystone ring is illustrated at 80 in collapsed state in the respective line seated or band seated position in FIG. 8 and fully seated position in FIG. 9. During exhaust and intake strokes, essentially line contact according to the inventive principles hereof is effected between a line or a flat seal band 82 forming the inner periphery of the bottom side 84 of the ring and a confronting bottom side 86 of the wedge shaped or tapered ring receiving groove 88. During collapse of the ring 80 from its free spring condition, not shown, to the collapsed, line or band seated, operating position as shown in FIG. 8, no twist occurs because no twist-providing asymmetry is present in the cross section of the ring 80. Essentially line contact results because the groove side 86 is machined to have a slight angle to the horizontal which is somewhat greater than the slight angle which the ring side 84 makes with the horizontal.

Both the compression pressure and the firing pressure in the engine cause the ring side 84 to fully seat in face contact against the bottom side 86 of the groove, as shown in FIG. 9.

PLAIN KEYSTONE, LAPPING—FIG. 10

For purposes of lapping the keystone ring 80 is, with no attendant twist because of lack of torsion from asymmetry, collapsed from the free spring state indicated by the broken lines 80a to the line contact position in collapsed state as shown by the solid lines 80 in FIG. 10. A lapping fixture 92 therefor has an open mouth 94 holding the ring in collapsed state with the inside and outside diameters of the respective mouth and ring equal to the cylinder bore size of the engine for which the ring is designed. The inner periphery only of the bottom side 84 projects into contact with a fixed confronting lapping surface 96.

The lapping surface 96 is convex, being for example, frusto conical or, as actually illustrated, frusto spherical. The ring 80 is maintained in a consistent attitude relative to the surface 96 so as to have the bottom side 84 form the same slight angle thereto at all times. Figure eight lapping movement or other suitable motion of the fixture 92 relative to the fixed lapping surface 96 abrades away the high spots and shapes the inner periphery of the side 84 into a seal band 82 which can lie along a groove side in a continuous line.

The shallow mouth 94 is shallow enough not to interfere with the surface 96 and yet is at the same time deep enough to insure that the ring 80 is firmly retained in collapsed state.

The groove for the keystone ring is, in contrast to the grooves for the other rings herein described, never narrow enough so that the ring simultaneously touches the upper and lower groove sides. Hence, the keystone ring when within a comparatively wide groove, as well as the other rings when within similarly appropriately wide receiving grooves, are forced into the line seated operating position against the bottom side of the groove only on the exhaust stroke. Nevertheless the line seated position offers help which is of a critical nature during compression and firing, but offers no help at all during suction when, in point of fact, the ring is drawn up against the upper side of the groove. During compression and firing as just referred to, the line seated position is critical for sealing at the first stage in order that, as the second stage, the rising pressure can accumulate and cause full seating of the ring in face contact with the lower side of the groove.

In torsion rings, simultaneous engagement between the ring and both sides of the groove (i.e., the groove is comparatively narrow in the sense just referred to) is, though not always so desirable when ever the amount of ring twist is to be limited by engagement of the ring with both sides of the groove. Simultaneous engagement is also desirable for other reasons and, though not essential, is especially desirable with certain rings. For example, some negative torsion rings can display a deficiency both during exhaust and also during compression and firing by its failure to establish proper line seated position because of the inherent geometric incompatibility between the nonconcentric frusto conical bottom ring side and the circular outer edge of the groove bottom side.

My inventions aid in overcoming such deficiency in the negative torsion spring embodiment now to be described.

NEGATIVE TORSION OR REVERSE DISH RING—FIG. 11

A negative torsion compression ring 100 is illustrated in FIG. 11. The cross section causes the ring, when collapsing, to twist or distort from its normal relaxed or free spring state into the parting closed state whereby the lower side 102 of the ring in contacting the rectangular receiving groove will bear against the outer part of the lower groove side 104, inclining upwardly and inwardly therefrom. The upper side 106 of the ring in simultaneously contacting the receiving groove will bear against the inner part of the upper groove side 108, pressing thereagainst with a narrow seal band 112 at the ring side periphery and inclining downwardly and outwardly therefrom.

The negative torsion ring 100, by reason of the undercut 114 thereof being located in the back of the ring adjacent the lower side 102, dishes convexly upwardly and serves primarily as a compression ring, preferably, as the second, third, etc., compression ring below the first or top compression ring, not shown.

Notwithstanding the fact that the lower side 102 of the ring theoretically seals the lower groove side 104 to prevent any oil entering the ring groove, the slight frusto conicity of the side 102 at least in theory will not firmly seat along the circular confronting portion of the groove side 104 for the reasons given, except when the two are geometrically concentric.

However, the planar band 112 and the confronting planar upper groove side 108 establish at least line contact in all radially shifted positions and therefore prevent passage of oil in or out of the groove. Specifically, close line contact of the band 112 during inward strokes of suction cause line seated sealing. Close line contact of the band 112 as the first stage during compression and firing, insuring proper pressure rise for the second stage of full seating of the ring, is essential to establishment of the face contact of full seating. Also, line contact of the band 112 which is enforced by the comparatively narrow rectangular groove during exhaust causes line seated sealing.

The negative torsion ring 110 is not illustrated in collapsed state in the fully seated operating position, which can be readily visualized as the stage beyond the point of occupying the position actually illustrated, i.e., the face contact stage beyond the point when the ring 100 is in collapsed state in the line seated operating position illustrated.

The general utility of my inventions as they apply to various rings is believed covered with adequate and representative examples hereinabove. In the interest of brevity, the specific utility of my inventions is now set out only with respect to the literal line contact modification of which FIG. 4 is illustrative and the narrow band contact modification of which FIG. 6 is illustrative, all as embodied in a positive torsion, rectangular ring. The advantage of positive torsion, despite the ring being fitted in a rectangular groove and hence being susceptible to sticking, is that the ring has an operatively built-in freedom of twisting motion tending to prevent buildup of carbon in the ring groove which, in accumulated quantities therein, can cause ring sticking. The effective sealing accomplished hereby insures twisting under the periodically trapped pressures, making the rectangular cross sectional ring to become entirely practicable. The designer can realize definite cost savings by avoiding turning to a keystone shape, which shape makes for a much more expensive ring due to the inside cone angularity of the major sides which must be worked upon during manufacture of the keystone ring.

There are two sure ways of taking advantage of my inventions to the last degree. The way, in the case of the foregoing rings or equivalents which accomplish effective line seating not literally so but actually by band seating, is to accurately lap a narrow seal band on the inner periphery of the seating side of every ring. The way, in the case of the foregoing rings and equivalents which accomplish line seating substantially literally, i.e., the sealing side of the ring has frusto conicity with the inner periphery of the side protruding and being substantially coplanar at all points on the periphery so as to have practically no width dimension, is with enforced selection-rejection by a 100 percent inspection process of all rings whereby any seal ring having a protruding inner periphery in which all points are not coplanar along the periphery is discarded.

At all events, the rings in both cases are used in the same way in engine manufacture, e.g., in the manufacturing process of an engine provided with a number of cylinders and with that number of ring grooved pistons individual to the respective cylinders. The process comprises sealing the pistons with the compression rings by installation of such a ring in each compression ring groove with an associated side of the groove confronting one sealing side of the ring; and construction of such engines by assembling individual pistons in the respective cylinders with each ring engaging a cylinder wall at all times to retain the ring in collapsed state on the piston, and with the ring effective during engine operation such as exhaust or suction to establish a substantially continuous pressure ring of at least line contact between the protruding inner periphery of the frusto conical one sealing side and its associated confronting groove side to seal the piston, and during engine operation such as compression or firing to establish a substantially continuous pressure ring of full seated contact between the major portion of the frusto conical one side and its associated confronting groove side to seal the piston. Engines so manufactured meet the desiderata of controlled blowby, and of controlled oil consumption to the degree that would be affected by blowby. That is to say, with low blowby being predictable it follows that oil consumption will be predictably low, in absence of inordinate conditions that might cause the engine to use excessive amounts of lubricating oil.

Broadly, the basic system here involved is to change from the case hitherto of having a good seal between ring side and groove side solely as the exception or happenstance, and instead to make it the general rule that the ring side and groove side have a substantially continuous ring of pressure contact when the ring is line seated or equivalent (i.e., narrow band seated) and when the ring is fully seated against the side of the groove. Not only is gas leakage avoided in excessive amounts such as might partially or altogether prevent a torsion ring from twisting, but also leakage at the ring is kept within minimum controlled limits.

As a practical matter, all of the smooth surfaces hereinabove discussed are either substantially flat or substantially cylindrical. Hence, the angularities are admittedly exaggerated in the drawings, particularly in the case of the face angle of the face 36, FIG. 2 which, in its practical range of about 1° or 2° or 3° from the vertical would at some point be hardly perceptible at all, and also in the case of the bottom side 26, FIG. 1, which is not much greater than the just stated 1° or 2° or 3° in angularity from the horizontal.

Variations within the spirit and scope of the inventions described are equally comprehended by the foregoing description.

What is claimed is:

1. A piston having a groove adapted to receive therein a parted ring in which, in the collapsed state of the ring, the parting becomes closed or substantially so, as in operation of the piston;

said groove presenting sides for confronting and being sealed by the received ring, and imparting a generally V-shape to the receiving groove; and a parted keystone seal ring in the groove having a ring side, and a face and a back adjacent the ring side and respectively joined to same at the side of the ring and forming corners therewith at that side;

said ring side arranged so as to be frusto conical when the ring is in collapsed state, and with the inner periphery thereof, which is at the corner of the junction with the back, establishing, in that state, a substantially continuous ring of contact with, when contacted by, the confronting groove side to be sealed;

the inner periphery of said ring side characterized by having all points thereof planar to one another to at least the equivalent of about ten to five light bands of flatness at standard inspection wavelength.

2. A piston having a groove adapted to receive therein a split seal ring which, when in collapsed state, becomes closed or substantially so, as in installation of the piston;

the axial and radial dimensions of said groove adapted to permit a received ring with live ring characteristics and positive torsion characteristics to be spring loaded mechanically and pressure loaded by gas and to be operatively free for twisting motion to prevent carbon build-up in the receiving groove, said groove presenting sides for confronting, and being sealed by, the received ring; and a split seal ring in the groove having a side, and a face and a back adjacent the side and respectively joined to same at the side of the ring and forming corners therewith at that side;

said ring side being frusto conical when the ring is in a collapsed twisted state, said ring side as viewed in that state in cross section adjacent the back having a narrow seal band thereon, which band is contiguous to the corner of the junction with the back, which band forms an angle of intersection with the major portion of the right side and constitutes the inner periphery of said side, and which band establishes a substantially continuous ring of pressure contact with, when contacted by, a confronting groove side to be sealed;

said ring comprising a ring spring having live ring characteristics and positive torsion characteristics, whereby the ring has in addition to the collapsed twisted state aforesaid in which said ring side is frusto conical, a free spring state in which said side is generally flat, and another collapsed state in which the spring is gas-flattened so that said side is generally flat;

said ring having a slight face angle;

the narrow seal band constituting the inner periphery of the ring side having all points thereof planar to at least the equivalent of about 10 to 5 light bands of flatness, at standard inspection wavelength.

3. A piston having a groove adapted to receive therein a split seal ring which, when in collapsed state, becomes closed or substantially so, as in installation of the piston;

said groove presenting sides for confronting, and being sealed by, the received ring; and a split seal ring in the groove having a side, and a face and a back adjacent the ring side and respectively joined to same at the side of the ring and forming corners therewith at that side;

said ring side arranged so as to be frusto conical at least when the ring is in collapsed state, and with the inner periphery thereof, which is at the corner of the juncture with the back, establishing, in that state, a substantially continuous pressure ring of contact with, when contacted by, the confronting groove side to be sealed;

the inner periphery of said ring side characterized by having all points thereof planar to one another to at least the equivalent of about 10 to 5 light bands of flatness at standard inspection wavelength.

* * * * *